Nov. 10, 1970  C. J. ESTERHOY, JR., ET AL  3,538,684
LIQUID/GAS SEPARATION PROCESS AND APPARATUS
Filed May 6, 1966  2 Sheets-Sheet 2

INVENTORS
CHARLES J. ESTERHOY Jr.
BY AUBREY W. MICHENER Jr.

AGENT

United States Patent Office 3,538,684
Patented Nov. 10, 1970

3,538,684
LIQUID/GAS SEPARATION PROCESS
AND APPARATUS
Charles J. Esterhoy, Jr., Morris Plains, and Aubrey W. Michener, Jr., Rockaway, N.J., assignors to Allied Chemical Corporation, New York, N.Y., a corporation of New York
Filed May 6, 1966, Ser. No. 552,373
Int. Cl. B01d 47/00; C07c 143/16, 143/24
U.S. Cl. 55—92               6 Claims

ABSTRACT OF THE DISCLOSURE

Process of separating entrained liquid from a gaseous stream particularly applicable to the separation of gas from liquid at the exit end of a sulfonation reactor of the type employing an annular gaseous sulfonating stream flowing between two concentric falling films of liquid to be sulfonated. The process utilizes a baffle having curved vanes thereon. The vanes direct the flowing gas stream downwardly and outwardly into the interior of a vessel and the baffle and vanes are so designed as to entrain substantially all of the liquid emerging from the sulfonator in the gas stream. The liquid is separated from the gas upon contact with the walls of the vessel.

---

This application relates to an improvement in liquid/gas separation apparatus and processes. The improvement is particularly adapted to be used in connection with continuous falling-film type sulfonation apparatus, where large quantities of entrained liquid must be removed from a gas stream.

Sulfonation apparatus is used, for example, for the reaction of alkylated mononuclear aromatic compounds, such as dodecyl or tridecyl benzene, with sulfur trioxide to obtain alkylated mononuclear aromatic monosulfonates useful in the manufacture of detergents. The same apparatus can also be used for sulfating such compounds as lauryl and myristyl alcohol. Accordingly, the term sulfonating as used hereafter refers also to sulfating.

The particular type of sulfonation apparatus with which this invention is particularly adapted to be used is known as a concentric sulfonator. Such a sulfonator consists essentially of a hollow cylinder inside of which is concentrically located a smaller cylinder. In its operation a thin annular film of the liquid organic compound to be sulfonated is caused to flow down the outside of the inner cylinder and the same type of annular film is caused to flow down the inside of the outer cylinder. Sulfur trioxide gas, preferably diluted with another gas such as air to form a sulfonating medium, is passed through the annulus formed between the two cylinders. In this manner the flowing liquid films are brought into contact with the sulfur trioxide and controlled reaction is allowed to take place to form compounds such as those mentioned above. This invention can, however, also be used with sulfonation apparatus wherein the smaller concentric cylinder is omitted.

Due to the close relationship between the gas and the flowing liquid films and due to the relative velocities necessary to bring about a proper reaction, a certain amount of the sulfonated liquid organic compound is entrained in the flowing gas stream. Since this entrained material is part of the product of the reactor, it is desirable to recover it by a separation process.

Separation processes for recovery of liquid sulfonation products have two main criteria. First, a very high degree of separation (for example, 99.5%+) should be achieved. Second, in order to prevent oversulfonation in the separator, the liquid and gas should have a short residence time in the separator, and to insure a short liquid residence time, all the liquid contacted surfaces must be continuously irrigated with product.

Separation processes which are known to the art as being successful in other uses are unsuitable for use with falling-film type sulfonation processes because they do not meet the above criteria. Examples of such unsuitable processes are the expansion chamber and baffle box separation processes. The former operates by passing the gas stream carrying entrained liquid from a small passage into a large passage and achieves separation as a result of a sudden decrease in velocity. The latter achieves separation by means of passing the gas stream with entrained liquid through a tortuous path consisting of many baffles. Separation is achieved by the resultant velocity decrease and deposition of liquid on the baffles. Both of these prior art processes are unsuitable for use with falling-film type sulfonators due to the large surface areas which they require. These surface areas are extremely difficult to continuously irrigate and thus present areas where the liquid product can stagnate and oversulfonate.

We have devised a novel separation process utilizing centrifugal force to achieve a separation of up to 99.5% or more and meet the criteria detailed above. In this novel process the falling-film from the sulfonation apparatus is deliberately and substantially completely entrained in the gas stream and the resultant gas-liquid mixture is hurled tangentially against a surface upon which the liquid deposits and thus is separated from the gas. It was indeed unexpected that a process which deliberately entrains substantially all the product liquid could achieve such a high degree of separation.

The apparatus for carrying out this process comprises a hollow cylindrical vessel closed at its top and bottom. Through the top of the vessel protrudes the bottom end of a concentric sulfonator comprising inner and outer concentric hollow cylinders each having a film of liquid flowing downwardly thereon and a gas stream carrying entrained liquid flowing through the annulus therebetween. A downwardly and outwardly sloping hollow frusto-conical baffle having vanes on its upper surface is positioned inside the top of the vessel in such a manner that the vanes substantially block the annular flow path of the gas stream and liquid films passing from the sulfonator. The effect of this blocking is to entrain in the gas stream substantially all of the liquid films flowing from the sulfonator and during this entrainment to keep the baffle and vane surfaces substantially completely irrigated with liquid. The vanes are positioned in such a manner as to force the flowing gas, together with its entrained liquid, spirally outwardly and downwardly against the inside wall of the vessel. The vanes are so designed as to utilize to a maximum degree the force of the flowing gas to hurl the particles of entrained liquid with maximum force toward the wall of the vessel so as to tangentially contact it. A recovery pipe for liquid is connected to an opening in the bottom of the vessel. A hollow outlet cylinder for receiving the separated gas protrudes into the vessel through the bottom thereof and ends in an open top positioned just below said frusto-conical baffle.

The manner in which the apparatus functions is briefly set forth below. The flowing gas containing entrained liquid passes through the annulus previously described in the sulfonator and enters the separator where it strikes the baffle and vanes which direct it spirally outwardly and downwardly toward the inner wall of the vessel in such a manner as to tangentially contact said inner wall. As a result of this tangential contact the liquid separates and tends to flow helically downwardly around the wall of the vessel and collects in the bottom thereof. The liquid films flowing from the sulfonator also enter the separator and are deliberately substantially completely entrained by the spirally flowing gas stream in a manner described in more detail subsequently. The liquid thus entrained from the films is separated from the gas stream by the same process of tangential contact previously described. The separated liquid is recovered through the recovery pipe in the bottom of the vessel. The swirling gas which carries the entrained liquid particles against the vessel wall deposits the said particles on the wet surface of the wall and then itself tends to flow helically downwardly adjacent the vessel wall. However, it loses its downward momentum before reaching the bottom of the vessel and then tends to flow upwardly around a central hollow outlet cylinder in the vessel, into the open top of the hollow cylinder and from there out through the cylinder and through an exhaust system through which is passes out of the vessel. The separated gas is then either recycled or expelled into the atmosphere. Such a flow is assured by maintaining a slight pressure differential between the sulfonator and the exhaust system.

This invention will be more particularly described with respect to the accompanying drawings, from which certain conventional features such as thermal expansion joints have been omitted for purposes of simplicity, wherein.

Figure 1:
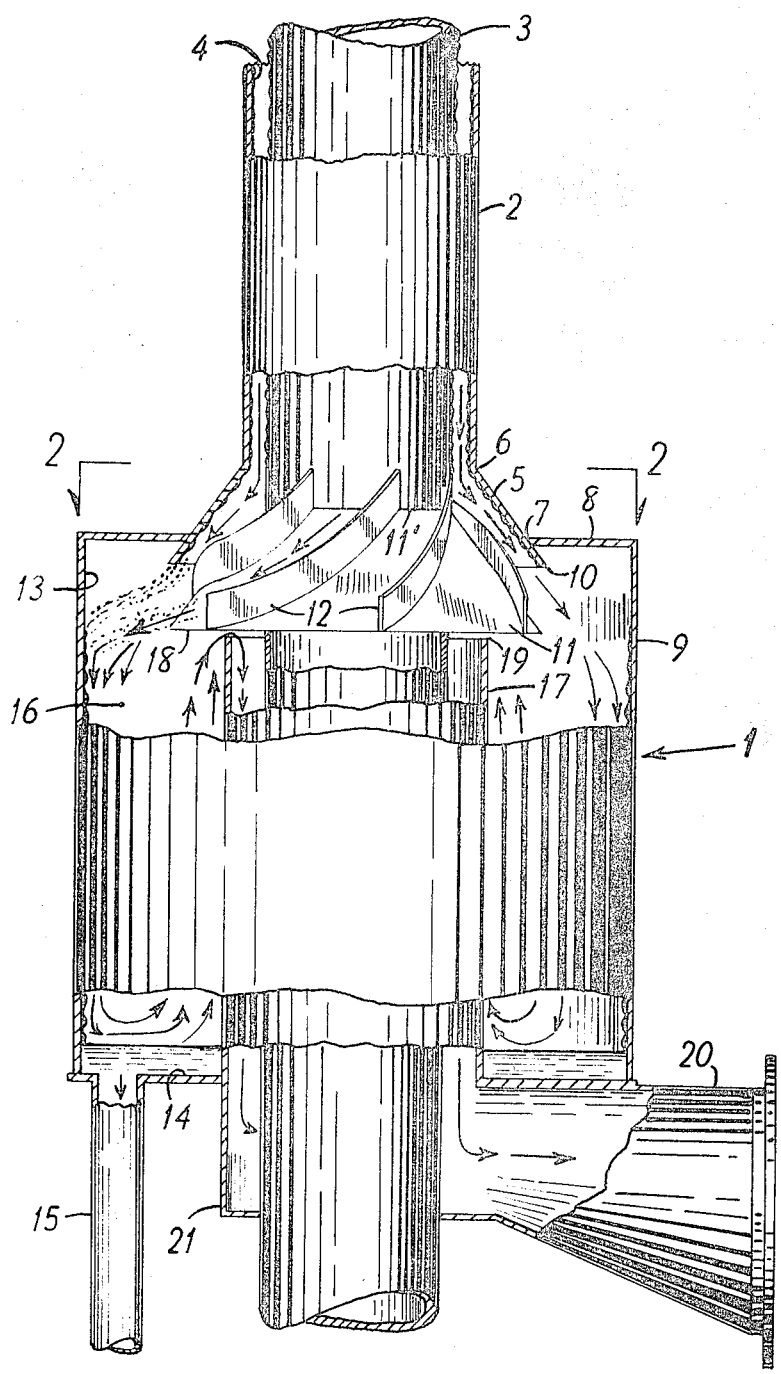
FIG. 1 is an elevational view of the separator of this invention with some parts broken away to reveal the interior.
Figure 2:
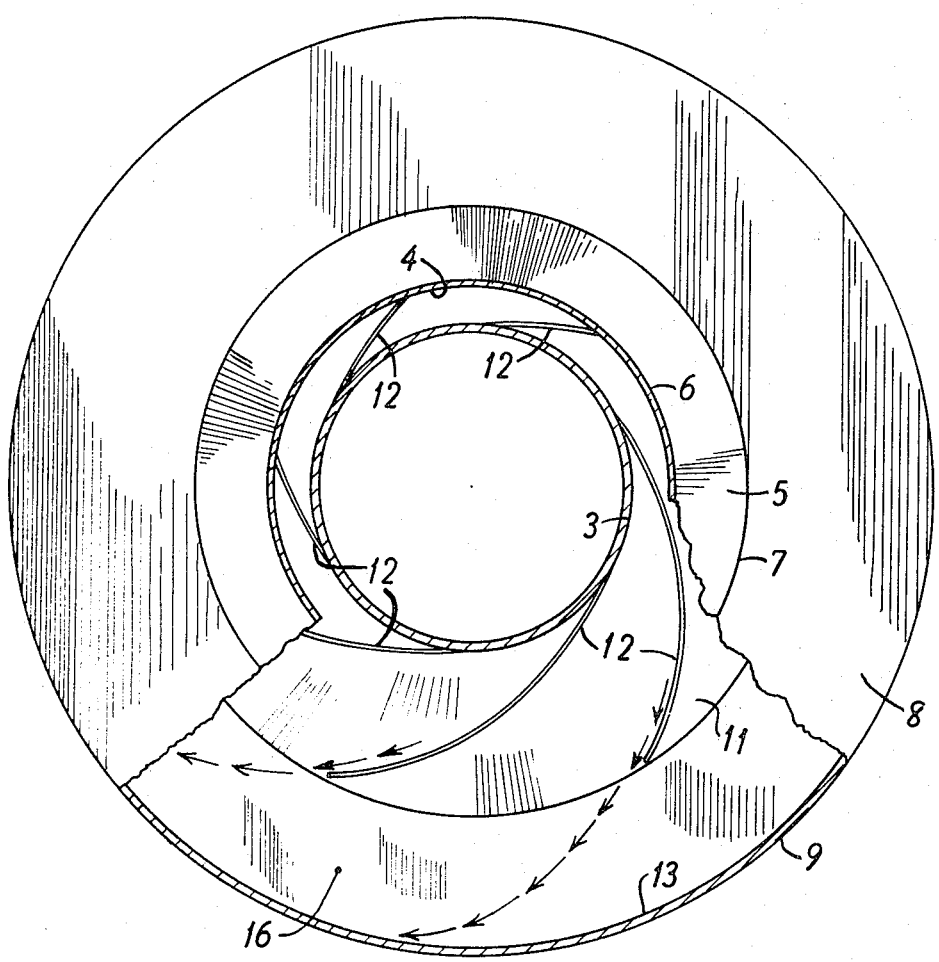
FIG. 2 is a cross-sectional view taken along a line 2—2 of FIG. 1.

Referring more particularly to FIG. 1, refrence numeral 1 refers broadly to the separator. Reference numeral 2 refers broadly to the bottom end of the sulfonator which is connected to the separator. Reference numeral 3 refers to the inner cylinder of the sulfonator. Reference numeral 4 refers to the outer cylinder of the sulfonator. Inside inner cylinder 3 and outside outer cylinder 4 are located cooling jackets which absorb part of the heat generated in the sulfonator by the sulfonation process. For purposes of clarity these cooling jackets, which are of conventional construction, have not been shown. Reference numeral 5 indicates a frusto-cone attached at 6 to the bottom of outer cylinder 4. The frusto-cone 5 is used to accommodate the shape of frusto-conical baffle 11 which will be described later. The frusto-cone is connected at 7 to the top wall 8 of vessel 9 and protrudes therethrough a short distance to form flange 10. Reference numeral 11 indicates the outwardly and downwardly sloping frusto-conical baffle attached at 11' to the bottom of inner cylinder 3 and positioned below and concentric with frusto-cone 5. Vanes 12 are connected to and extend perpendicularly from the outer surface of frusto-conical baffle 11. The vanes extend substantially across the annulus formed between frusto-cone 5 and frusto-conical baffle 11 (i.e. they come very close to contacting the inner wall of frusto-cone 5 but are constructed not to contact so as to preclude thermal expansion problems which such contact might raise). The vanes curve around baffle 11 beginning at the upper end thereof and ending adjacent the lower end thereof. Reference numeral 13 indicates the inner wall of vessel 9. Reference numeral 15 indicates a liquid product recovery pipe leading from the bottom 14 of the vessel. Reference numeral 17 indicates a hollow outlet cylinder protruding concentrically into the vessel 9 through the bottom 14 thereof and ending in an open top 19 located below and concentric with conical baffle 11. Reference numeral 20 indicates an exhaust tube connected to and leading from the lower end 21 of hollow outlet cylinder 17, which lower end 21 extends outside of the bottom 14 of vessel 9.

The manner in which the apparatus functions is described below:

The flowing gas containing entrained liquid passes through the annular space formed between inner cylinder 3 and outer cylinder 4 in sulfonator 2. It strikes vanes 12 on frusto-conical baffle 11 and is hurled spirally outwardly and downwardly against inner wall 13 of vessel 9. The flowing film on inner cylinder 3 flows over the surface of baffle 11, strikes vanes 12 and is thereby substantially completely entrained by the flowing gas and hurled toward inner wall 13. In the process of passing over the baffle 11 and vanes 12 the flowing film maintains them thoroughly and continuously irrigated. The flowing film on the inside of outer cylinder 4 flows down said inner wall and the greater proportion of the liquid drops onto frusto-conical baffle 11 and is substantially completely entrained by the flowing gas in the same manner as the film flowing down inner cylinder 3. However, sufficient liquid flows down the inner surface of frusto-cone 5 to keep the surface thereof continuously irrigated. The liquid flowing down the inner surface of frusto-cone 5 drops off the flange 10 formed by the bottom of said frusto-cone, is substantially completely entrained by the turbulent gas being hurled from the vanes 12 and is deposited on inner wall 13 of vessel 9. The construction of vanes 12 is such that the liquid hurled outward thereby tangentially strikes the inner wall 13 of vessel 9. The liquid deposited on inner wall 13 completely wets the wall and flows downward toward bottom 14 of the vessel 9 in a somewhat helical pattern due to its momentum. The liquid is recovered from bottom 14 of vessel 9 through recovery pipe 15. The separated gas, after depositing the entrained liquid on inner wall 13, flows helically downwardly through space 16 until it loses its momentum. Then, due to the slightly lower pressure in the exhaust tube 20, the gas flows upwardly along the outer non-wetted surface of hollow outlet cylinder 17, under the bottom 18 of conical baffle 11, into the open top 19 of hollow outlet cylinder 17 and out through exhaust tube 20 to be either expelled to the atmosphere or recycled through the sulfonator as desired.

It has been found that the separator functions best when certain proportions are maintained in its construction. The diameter of hollow outlet cylinder 17 should be slightly greater than the diameter of inner cylinder 3 of the sulfonator, the difference in these diameters being sufficient to preclude undue restriction of gas flow into open top 19 of hollow outlet cylinder 17. The diameter of vessel 9 should be about 2 to 3 times the diameter of hollow outlet cylinder 17. Conical baffle 11 should extend out sufficiently far from hollow outlet cylinder 17 so as to shield open top 19 thereof but should not extend so near inner wall 13 of vessel 9 as to cause splashing thereon. It has been found that if conical baffle 11 extends about 0.2 to 0.6 the distance from hollow outlet cylinder 17 to inner wall 13 of vessel 9, the desired flow characteristics are achieved. The preferred baffle extension is about 0.5 the said distance. The angle that baffle 11 makes with the horizontal plane of its base is preferred to be about 40 to 50°. However, this angle can be varied to suit the viscosity of the sulfonated liquid; for example, it can be decreased to flatten the conical baffle for use with more viscous liquids. It is preferred that the base of conical baffle 11 be positioned about level with the open top 19 of hollow outlet cylinder 17. However, conical baffle 11 can extend down over the top 19 of hollow outlet cylinder 17 if desired, so long as open top 19 is not brought sufficiently close to the underside of baffle 11 as to unduly restrict flow of gas into open top 19. In some circumstances it may be desirable to add a short flange to the bottom 18 of conical baffle 11, the flange taking the form of a short hollow cylinder, not shown, depending from the bottom 18 of said baffle and extending down over a short portion of the top of hollow outlet cylinder 17. When such a flange is used it may be desirable to slightly shorten the top of hollow outlet cylinder 17 so as to lessen restriction of gas flow therethrough.

The above disclosure and accompanying drawings are for purposes of description only and other embodiments and modifications will be apparent to those skilled in the art. Therefore our invention should be constructed as limited only by the scope of the following claims.

We claim:

1. A process for separating entrained liquid from a gaseous sulfonating medium stream resulting from a sulfonation process carried out by passing a stream of said sulfonating medium through the center of two concentric annular flowing liquid films which comprises the steps of entraining substantially all of the flowing liquid film in the gaseous stream containing entrained liquid by hurling the gaseous stream and flowing film spirally outwardly and downwardly tangentially against a wall surface upon which the liquid deposits and flows downwardly on said wall surface to a reservoir, separately discharging said liquid and removing to an outlet the gaseous stream separated from the liquid deposited on said wall surface substantially free of entrained liquid.

2. The process of claim 1 wherein said gaseous stream is passed through the annulus formed between said annular flowing film and a concentric second annular flowing liquid film and wherein said second film is also deliberately substantially completely entrained in said spirally flowing gaseous stream.

3. The process of claim 2 wherein said hurling is achieved by passing the gaseous stream and entrained liquid over a baffle surface having curved vane surfaces protruding therefrom and wherein said outlet is positioned adjacent to and below said baffle surface and is shielded thereby from entrained liquid.

4. The process of claim 3 wherein said flowing liquid film continuously and completely irrigates said wall surface, said baffle surface and said curved vane surfaces.

5. Apparatus for separating liquid from gas comprising:
   (a) an outer hollow cylinder, the inside surface of said outer cylinder being adapted to serve as a flow path for a liquid film,
   (b) an inner hollow cylinder, the outside surface of said inner cylinder being adapted to serve as a flow path for liquid film,
   (c) a hollow vessel attached to said outer hollow cylinder and communicating therewith, the inner surface of said hollow vessel being adapted to serve as a surface for the deposition of and as a flow path for separated liquid,
   (d) baffle means positioned in said vessel and on said inner cylinder at the area of communication of said vessel with said outer cylinder, said baffle means being adapted to deflect liquid and gas flow from said inner and outer hollow cylinders,
   (e) curved vane means protruding from said baffle means, said curved vane means being adapted to hurl gas deflected by said baffle means outwardly and downwardly tangentially against the inner surface of said vessel and to substantially completely entrain in said gas liquid flowing onto said baffle from the inner surface of said outer hollow cylinder and the outer surface of said inner hollow cylinder,
   (f) a liquid outlet passage in the bottom of said vessel,
   (g) hollow gas outlet cylinder means protruding through the bottom of said vessel and having an open end positioned adjacent and below said baffle means so as to be shielded from liquid thereby, the space between the outlet cylinder means and the inner surface of said hollow vessel being unobstructed.

6. The apparatus of claim 5 wherein said baffle means comprises a frusto-conical baffle which surrounds and protrudes from said inner cylinder and extends about 0.2 to 0.6 the distance between the outer wall of said gas outlet cylinder and the inner wall of said vessel, and the diameter of said hollow vessel is 2 to 3 times the diameter of said hollow gas outlet cylinder means.

References Cited

UNITED STATES PATENTS 2,580,317  12/1951  Pekar et al. _____ 55—456
3,328,460  6/1967  Vander Mey _____ 260—459

LEON ZITVER, Primary Examiner

L. DE CRESCENTE, Assistant Examiner

U.S. Cl. X.R.

23—284; 55—238, 457; 260—459, 505